United States Patent [19]
Fan

[11] Patent Number: 5,508,123
[45] Date of Patent: Apr. 16, 1996

[54] POWER SUPPLYING DEVICE

[75] Inventor: Chih-Lung Fan, Taipei, Taiwan

[73] Assignee: Wey Henn Co., Ltd., Taipei, Taiwan

[21] Appl. No.: 399,932

[22] Filed: Mar. 6, 1995

[51] Int. Cl.$^6$ ........................................................ H01M 2/10
[52] U.S. Cl. .................... 429/96; 429/9; 429/97; 429/99; 429/100
[58] Field of Search ........................ 429/9, 96, 97, 429/99, 100

[56] References Cited

U.S. PATENT DOCUMENTS

| | | | |
|---|---|---|---|
| 5,242,767 | 9/1993 | Roback et al. | 429/97 |
| 5,399,446 | 3/1995 | Takahashi | 429/90 |

Primary Examiner—Stephen Kalafut
Assistant Examiner—Richard H. Lilley, Jr.
Attorney, Agent, or Firm—Alfred Lei

[57] ABSTRACT

A power supplying device including a body portion having an inner end with a vertical wall on which are mounted a pair of electrodes, the vertical wall having a bottom extending outwardly to form a battery seat, the battery seat having a bed provided with two opposite grooves one at each side thereof and a spring-loaded retainer member close to an outer edge of the battery bed, a dry battery pack including a housing and a cover, the housing being for receiving dry batteries and provided at one end with two openings for mounting a pair of electrodes, the housing having a bottom formed with two flanges one at each side thereof and a slot close to another end of the housing, and a rechargeable battery pack including a casing and a covering plate, the casing being for receiving rechargeable batteries, the covering plate having a cavity adapted to receive the retainer member, the casing having a bottom formed with two flanges one at each side thereof.

2 Claims, 3 Drawing Sheets

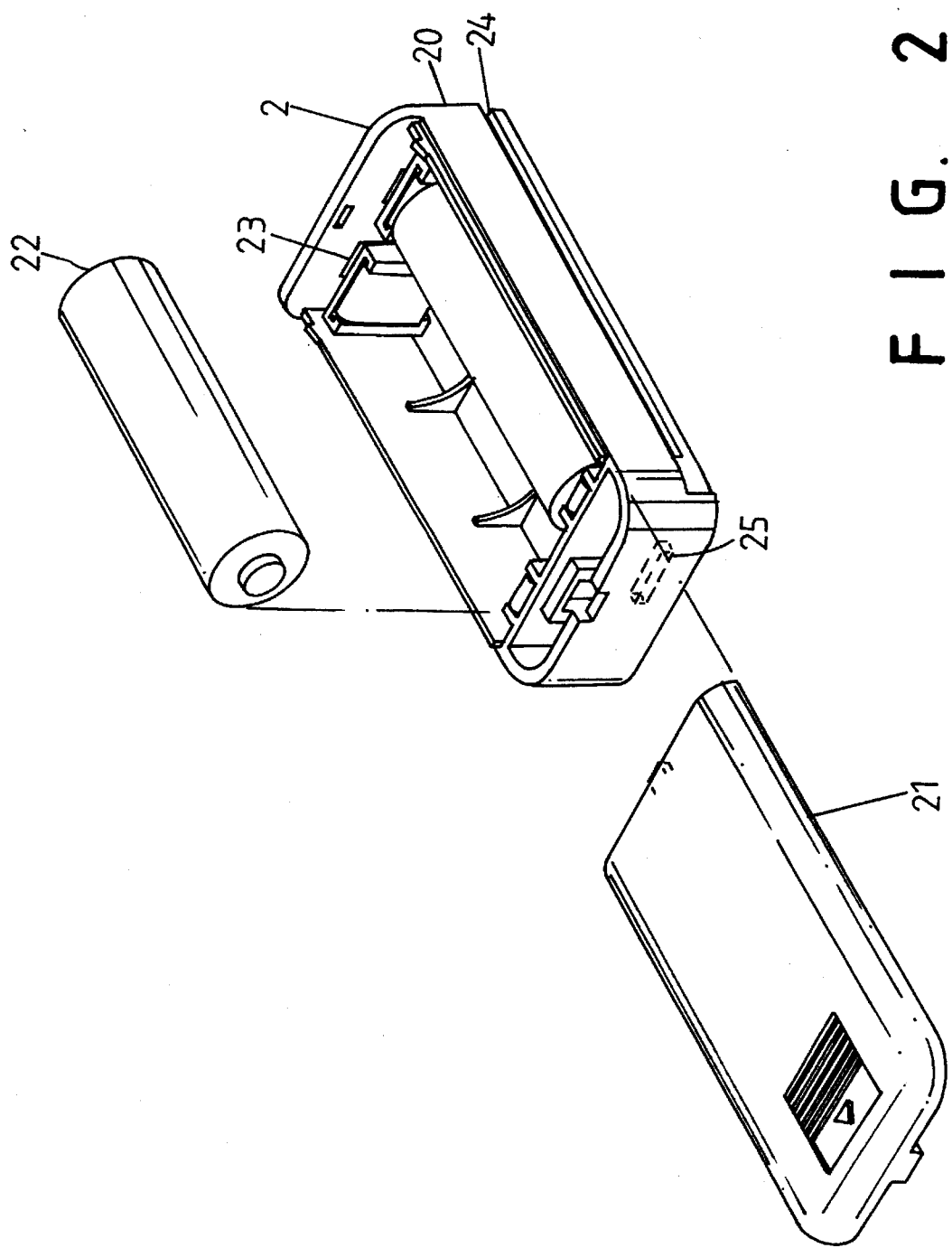
F I G. 2

POWER SUPPLYING DEVICE

BACKGROUND OF THE INVENTION

It has been found that the conventional household electrical appliances, e.g. electric trimmers, mobile telephones, or electrical cutters are supplied with only dry batteries or rechargeable batteries thereby causing much inconvenience in use. Hence, when the power supply for such electrical appliances fails, they will not be able to be used any longer.

Therefore, it is an object of the present invention to provide an improved supplying device which can obviate and mitigate the above-mentioned drawbacks.

SUMMARY OF THE INVENTION

This invention relates to a power supplying device.

It is another object of the present invention to provide a power supplying device which can be adapted for use with a dry battery pack or a rechargeable battery pack as desired.

It is another object of the present invention to provide a power supplying device which is convenient to operate.

It is still another object of the present invention to provide a power supplying device which is simple in construction.

It is still another object of the present invention to provide a power supplying device which is practical in use.

It is a further object of the present invention to provide a power supplying device which is easy to produce.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 2 is an exploded view of the dry battery pack;

FIG. 4 shows another application of the present invention.

DETAILED DESCRIPTION OF THE PREFERRED EMBODIMENT

Figure 1:
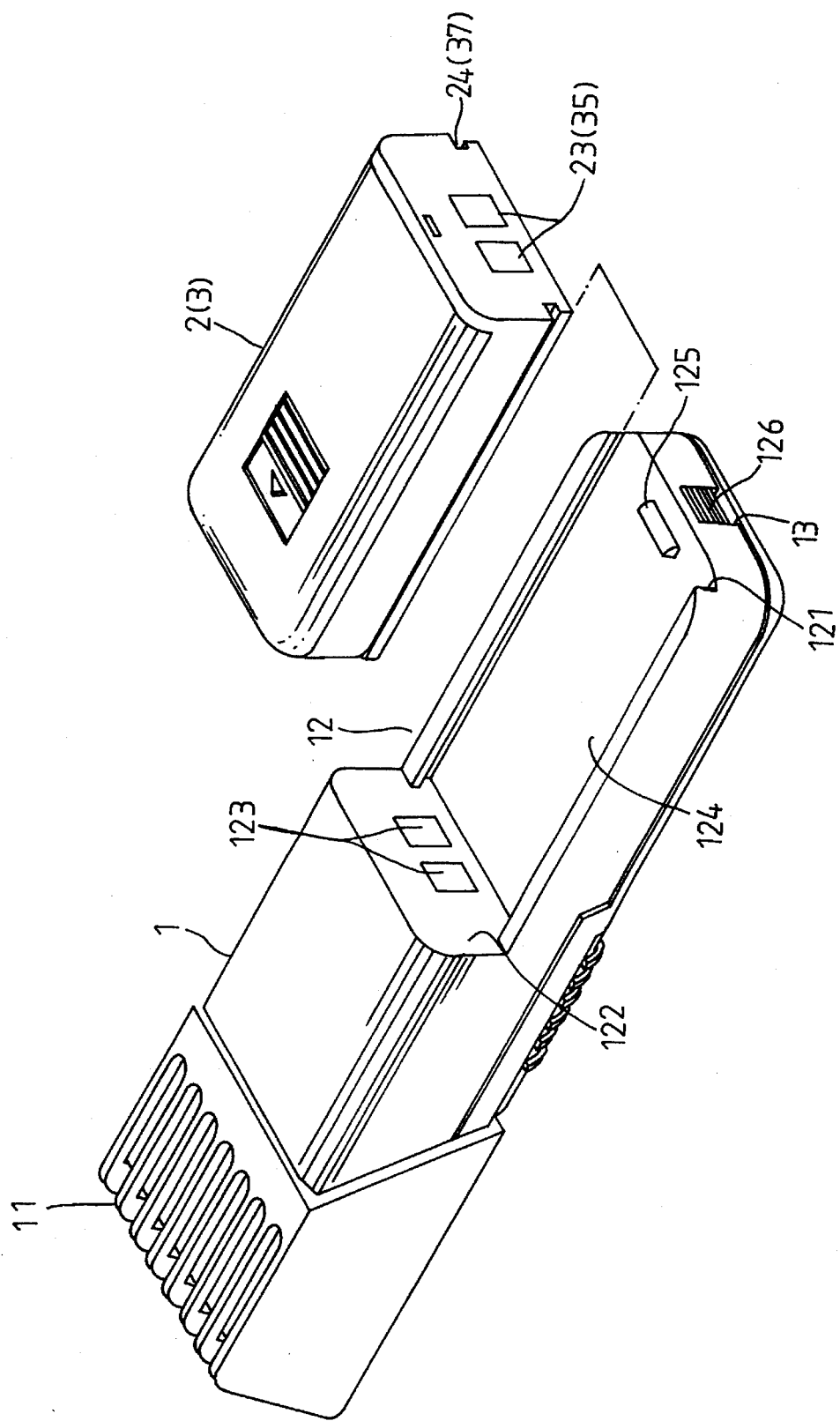
FIG. 1 is an exploded view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the power supplying device according to the present invention comprises a body portion 1, a dry battery pack 2, and a rechargeable battery pack 3. The body portion 1 may be replaced with any electrical appliance and in this preferred embodiment, is provided with a trimmer 11 at the outer end. The inner end of the body portion 1 has a vertical wall 122 on which are mounted a pair of electrodes 123. The vertical wall 122 extends from its bottom outwardly to form a battery seat 12 which is formed with a bed 124 provided with two grooves 121 one at each side thereof. A spring-loaded retainer member 125 is provided close to the outer edge of the battery seat 12. A recess 13 is formed at the outer end of the battery seat 12, in which is fitted an adjusting knob 13. The adjusting knob 13 is connected with the spring-loaded retainer member 125 by known means so that the adjusting knob 13 may be pulled down into the battery seat 13 by the adjusting knob 13.

Looking now at FIG. 2, there is shown an exploded view of the dry battery pack 2. As illustrated, the dry battery pack 2 includes a housing 20 and a cover 21 adapted to reclosably engage the top of the housing 20. The housing 20 is designed to accommodate two dry batteries 22 and provided at one end with two openings for mounting a pair of electrodes 23. The bottom of the housing 20 is formed with two flanges 24 one at each side thereof, and a slot 24 close to the other end of the housing 2.

Figure 3:
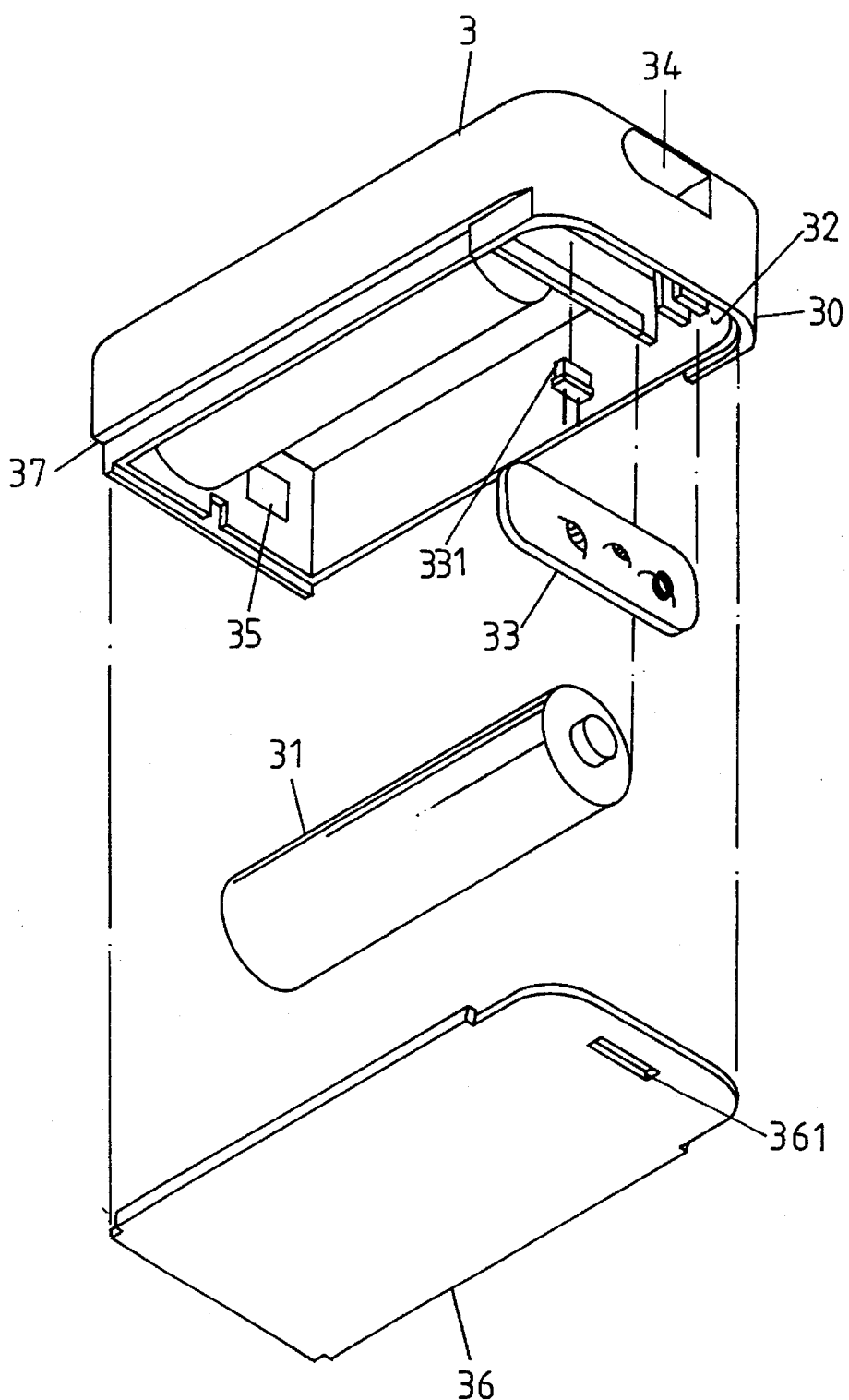
FIG. 3 is an exploded view of the rechargeable battery pack.

Looking now at FIG. 3, there is shown an exploded view of the rechargeable battery pack 3. As can be seen, the rechargeable battery pack 3 includes a casing 30 and a covering 36 adapted to reclosably engage the bottom of the casing 30. The casing 30 is designed for receiving two rechargeable batteries 31 and provided at one end with a chamber 32 in which is fitted a printed circuit board 33 provided with a LED 331. The LED 33 partly protrudes out of the casing 30 to serve as a charging indicator. The other end of the casing 30 is formed with two openings for mounting a pair of electrodes 35. The covering plate 36 has a cavity 361 adapted to receive the retainer member 125. Further, the bottom of the casing 30 is formed with two flanges 37 one at each side thereof.

Hence, the user may use any one of the dry battery pack 2 and the rechargeable battery pack 2 as desired. When the dry battery pack 3 is inserted into the battery seat 12, the flange 24 of the dry battery pack 2 is engaged with the grooves 121 of the battery 12, the electrodes 23 of the dry battery pack 2 are in contact with the electrodes 123 of the body portion 1, and the retainer member 125 of the battery seat 12 is engaged with the slot 25 of the dry battery pack 2. Further, when the rechargeable battery pack 3 is inserted into the battery seat 12, the flange 37 of the rechargeable battery pack 3 is engaged with the grooves 121 of the battery seat 12, the electrodes 35 of the rechargeable pack 3 are in contact with the electrodes 123 of the body portion 1, and the retainer member 125 of the battery seat 12 is engaged with the cavity 361 of the rechargeable battery pack 3.

Further, the retainer member 125 of the battery seat 12 is formed with a curved surface at the outer side so that it will be automatically pushed down when the battery pack 2 or 3 is inserted into the battery seat 2.

FIG. 4 shows an application of the present invention to a mobile telephone.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A power supplying device comprising:

a body portion having an inner end with a vertical wall on which are mounted a pair of electrodes, said vertical wall having a bottom extending outwardly to form a battery seat, said battery seat having a bed provided with two opposite grooves one at each side thereof and a spring-loaded retainer member close to an outer edge of said battery bed; and a dry battery pack including a housing and a cover adapted to reclosably engage a top of said housing, said housing being for receiving dry batteries and provided at one end with two openings for mounting a pair of electrodes, said housing having a bottom formed with two flanges one at each side thereof and a slot close to another end of said housing.

2. The power supplying device as claimed in claim 1, wherein said dry battery pack is replaced with a rechargeable battery pack including a casing and a covering plate adapted to reclosably engage a top of said casing, said casing being for receiving rechargeable batteries, said covering plate having a cavity adapted to receive said retainer member, said casing having a bottom formed with two flanges one at each side thereof.

\* \* \* \* \*